(12) United States Patent
Kelley, Jr.

(10) Patent No.: US 6,790,154 B1
(45) Date of Patent: Sep. 14, 2004

(54) REAR AXLE HAVING ELECTROMAGNETIC CLUTCHES AND GEARED DIFFERENTIAL

(75) Inventor: William R. Kelley, Jr., Novi, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/394,271

(22) Filed: Mar. 21, 2003

(51) Int. Cl.$^7$ .............................................. F16H 48/30
(52) U.S. Cl. ..................................... 475/150; 180/249
(58) Field of Search ............................... 475/222, 231, 475/150; 180/249

(56) References Cited

U.S. PATENT DOCUMENTS

| | | | |
|---|---|---|---|
| 4,735,108 A | 4/1988 | Teraoka et al. | |
| 4,838,119 A | 6/1989 | Teraoka et al. | |
| 4,934,213 A | 6/1990 | Niizawa | |
| 5,069,305 A | * 12/1991 | Kobayashi | .................. 180/249 |
| 5,083,986 A | 1/1992 | Teraoka et al. | |
| 5,699,888 A | 12/1997 | Showalter | |
| 5,749,801 A | 5/1998 | Teraoka et al. | |
| 5,845,546 A | 12/1998 | Knowles et al. | |
| 5,884,738 A | 3/1999 | Joslin et al. | |
| 5,910,064 A | 6/1999 | Kuroki | |
| 6,098,770 A | 8/2000 | Isley, Jr. | |
| 6,461,267 B1 | 10/2002 | Paielli | |
| 6,533,090 B2 | 3/2003 | Osborn et al. | |
| 6,578,654 B2 | * 6/2003 | Porter | .................. 180/249 |

FOREIGN PATENT DOCUMENTS

JP        11-125277        5/1999

OTHER PUBLICATIONS

Patent Abstracts of Japan, JP 11–125277.

* cited by examiner

*Primary Examiner*—Dirk Wright
(74) *Attorney, Agent, or Firm*—Brinks Hofer Gilson & Lione; Greg Dziegielewski (57) ABSTRACT

A rear axle assembly for a primary front wheel drive motor vehicle includes two electromagnetic clutches and a geared differential. A first electromagnetic clutch provides torque to the geared differential which, in turn, provides drive torque to two axles. The geared differential includes a second electromagnetic clutch operably disposed between the differential cage and the output shafts (axles). Activation of the first electromagnetic clutch provides controlled application of torque to the rear differential and activation of the second electromagnetic clutch progressively inhibits differentiation of the geared differential.

20 Claims, 5 Drawing Sheets

REAR AXLE HAVING ELECTROMAGNETIC CLUTCHES AND GEARED DIFFERENTIAL

BACKGROUND OF THE INVENTION

The invention relates generally to rear axle assemblies for front wheel drive motor vehicles and more particularly to a rear axle assembly having two electromagnetic clutches and a bevel gear differential.

Traction control and vehicle stability systems are the subject of significant contemporary engineering study and development. Many utilize sophisticated software receiving data from, for example, four independent wheel speed sensors to control a transfer case clutch providing variable torque delivery and brake application in order to improve vehicle handling, braking and overall control.

Mechanical drive line components and electronic control systems are well represented in the prior art. For example, U.S. Pat. No. 5,407,024 teaches an adaptive drive system in which torque is constantly provided to the rear wheels of a vehicle and a modulating clutch within a transfer case automatically and incrementally provides torque to the front wheels when a speed difference between front and rear wheels in excess of a variable threshold is detected. Front wheel drive vehicles also incorporate unique adaptive torque delivery and stability control systems. In one front wheel drive system, a rear axle having a pair of clutches may be independently engaged to provide torque to the left and right rear wheels. This system is disclosed in U.S. Pat. No. 6,327,935.

It is apparent that additional and diverse mechanical drive line components and software incorporating control strategies for four wheel adaptive drive systems are both possible and desirable.

BRIEF SUMMARY OF THE INVENTION

A rear axle assembly for a primary front wheel drive motor vehicle includes two electromagnetic clutches and a geared differential. A first electromagnetic clutch provides torque to the geared differential which, in turn, provides drive torque to two axles. The geared differential includes a second electromagnetic clutch operably disposed between the differential cage and the output shafts (axles). Activation of the first electromagnetic clutch provides controlled application of torque to the rear differential and activation of the second electromagnetic clutch progressively inhibits differentiation of the geared differential. The electromagnetic clutches may be actuated independently or together to provide three distinct operating modes: (1) only the first clutch actuated —operation as a four wheel drive vehicle with an open rear differential; (2) only the second clutch engaged—rear axle not driven but no speed differentiation between rear axles and (3) both clutches actuated—operation as a four wheel drive vehicle with no rear axle differentiation. It will be appreciated that the foregoing descriptions refer to the fully energized or actuated states of the clutches solely for the purpose of illustration and explanation. Since the clutches are modulating clutches, proportional or partial engagement of the clutches is possible to achieve selected, modulated levels of torque transfer through the first clutch and partial inhibition of differentiation by the second clutch.

It is thus an object of the present invention to provide a rear axle assembly having two electromagnetic clutches.

It is a further object of the present invention to provide a rear axle assembly having two electromagnetic clutches and a geared differential.

It is a further object of the present invention to provide a rear axle assembly for front wheel drive motor vehicles having a first electromagnetic clutch which controllably provides torque to a geared differential having a second electromagnetic clutch which controllably inhibits differentiation of the differential.

Further objects and advantages of the present invention will become apparent by reference to the following description of the preferred embodiment and appended drawings wherein like reference numbers refer to the same component, element or feature.

DETAILED DESCRIPTION OF THE INVENTION

Figure 1:
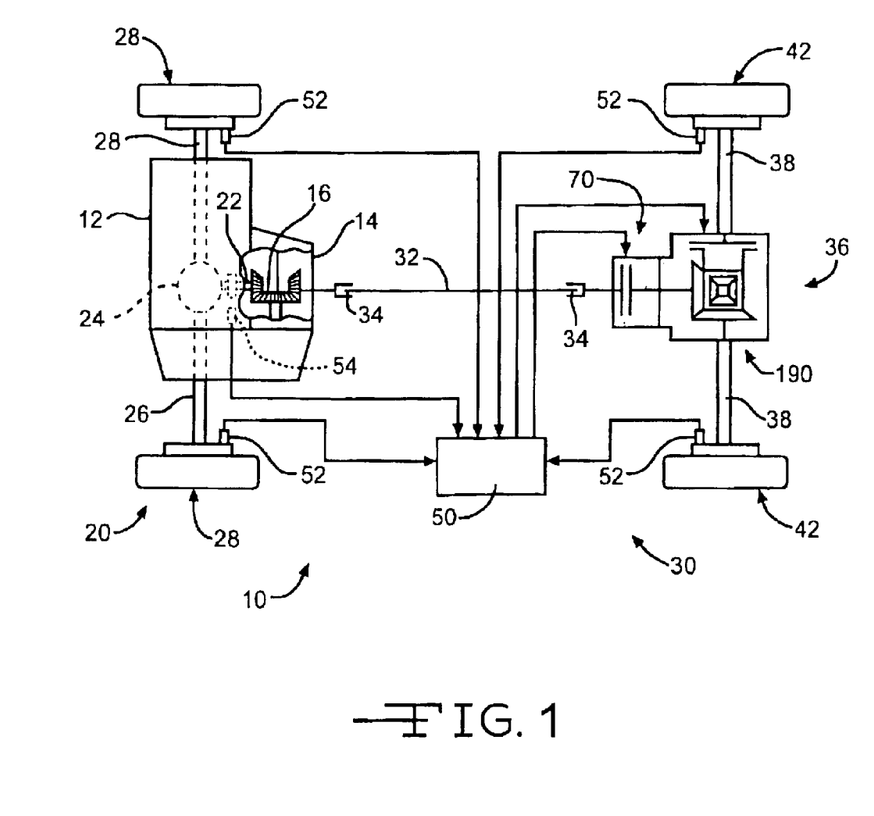
FIG. 1 is diagrammatic view of a four wheel drive motor vehicle power train have a rear axle assembly including two electromagnetic clutches and a differential according to the present invention.

Referring now to FIG. 1, four-wheel drive motor vehicle drive train having primary front wheel drive and incorporating the present invention is diagrammatically illustrated and designated by the reference number 10. The motor vehicle drive train 10 includes a prime mover 12 which is coupled to and directly drives a transaxle 14. The transaxle 14 may be either a manual or automatic transaxle and drives a beveled or spiral beveled gear set 16 which provides motive power to a primary or front drive line 20 comprising a front or primary prop shaft 22, a front or primary differential 24, a pair of live front axles 26 and a respective pair of front or primary tire and wheel assemblies 28. It should be appreciated that the front or primary differential 24 is conventional.

The bevel or spiral bevel gear set 16 also provides motive power to a secondary or rear drive line 30 comprising a secondary prop shaft 32 having appropriate universal joints 34, a rear or secondary axle assembly 36, a pair of live secondary or rear axles 38 and a respective pair of secondary or rear tire wheel and assemblies 42.

Associated with the motor vehicle drive train 10 is a controller or microprocessor 50 which receives signals from a plurality of wheel speed sensors 52. The wheel speed sensors 52 are preferably wheel speed sensors also utilized to provide signals to the antilock brake system (ABS) of the vehicle, a traction control system or a stability control system. Alternatively, they may be dedicated sensors utilizes solely by the microprocessor 50. Such sensors 52 are preferably Hall effect sensors although they may be variable reluctance sensors, optical sensors or analogous devices.

The controller or microprocessor 50 may also receive information from a sensor 54 associated with the primary or front prop shaft 22, a sensor (not illustrated) associated with rear or secondary prop shaft 32 and other vehicle operating conditions such as the current angular position of the front tire and wheel assemblies 28 as commanded by the vehicle operator, for example. The controller or microprocessor 50 includes software which receives and conditions signals from the sensors 52 and 54 and other vehicle sensors, determines corrective action to improve the stability of the vehicle and maintain control of the vehicle and/or corrects or compensates for a skids or other anomalous operating condition and provides a first output signal to a first electromagnetic clutch assembly 70 which selectively provides drive torque to the bevel gear differential and second electromagnetic clutch assembly 190.

Figure 2:
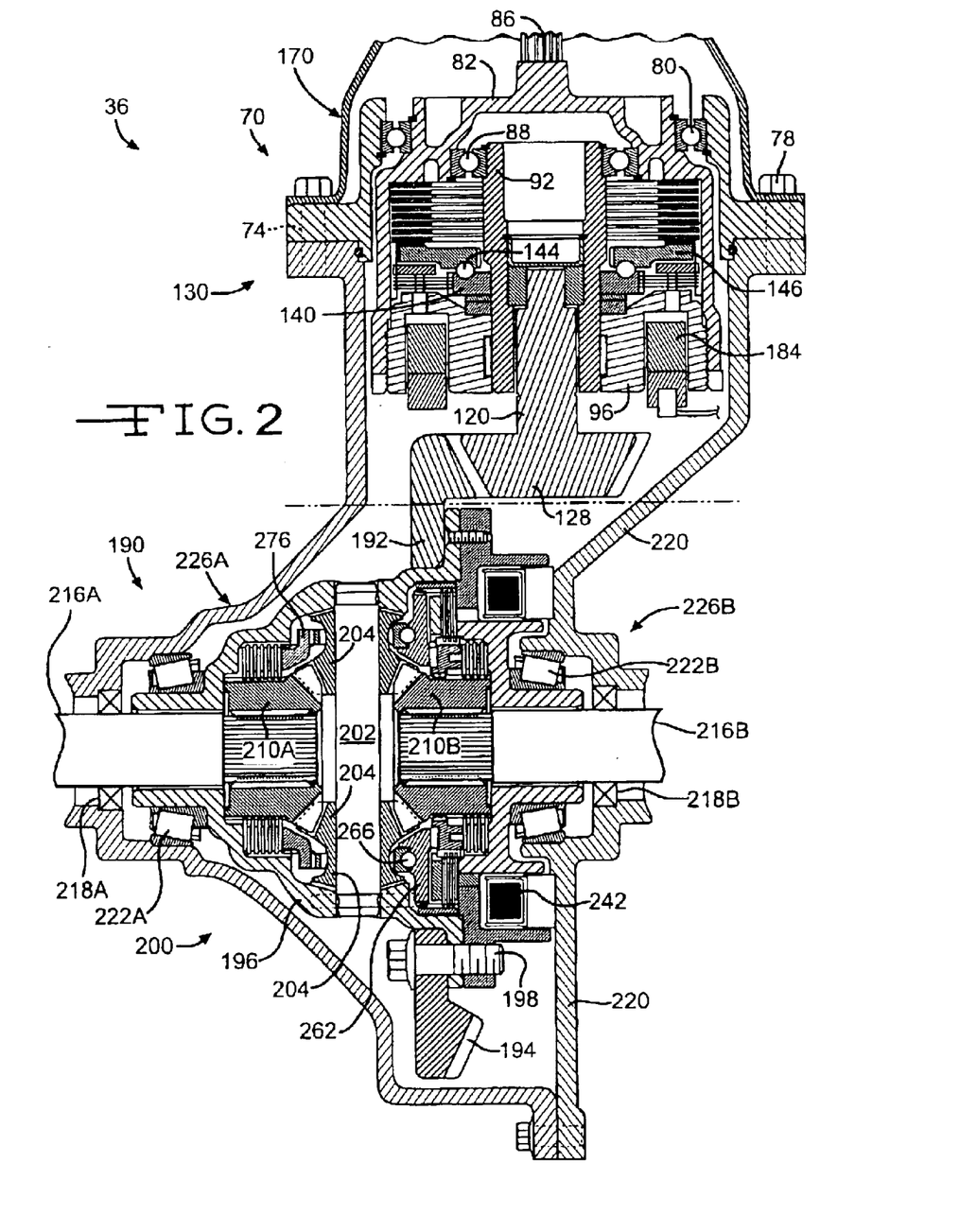
FIG. 2 is a full, sectional view of a rear axle assembly according to the present invention.
Figure 3:
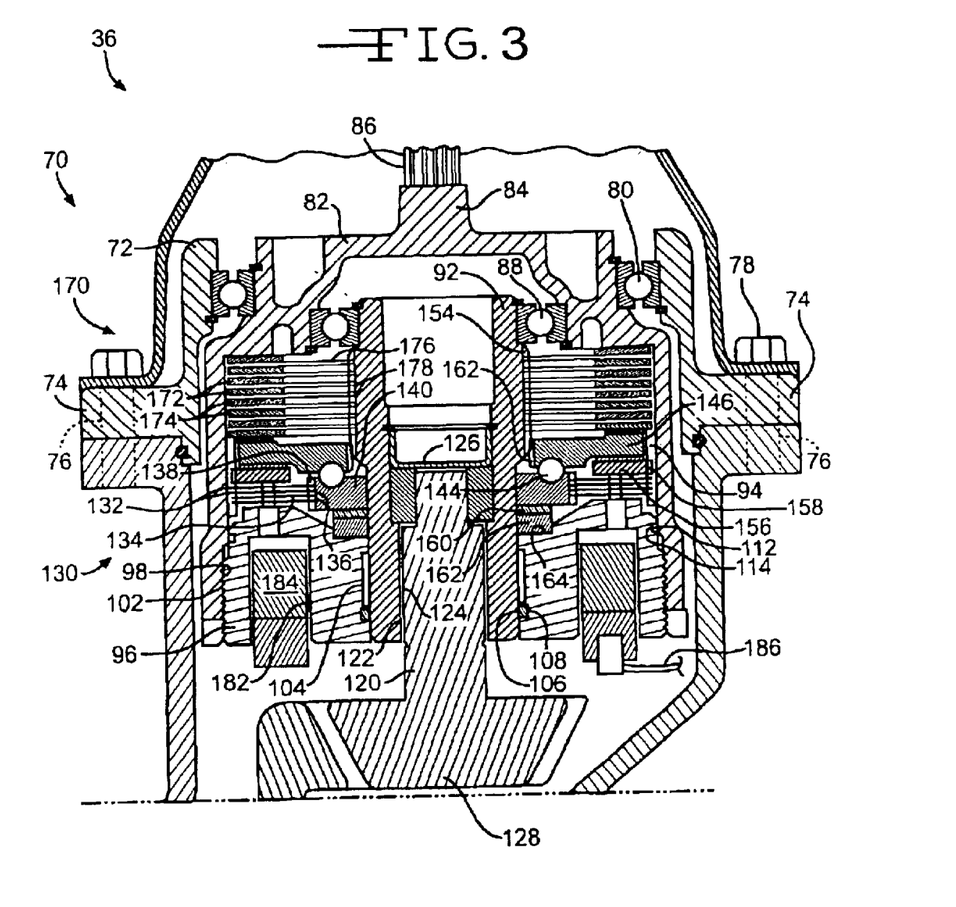
FIG. 3 is a enlarged, fragmentary, full sectional view of a first portion of rear axle assembly according to the present invention.

Referring now to FIGS. 2 and 3, the electromagnetic clutch assembly 70 includes a cylindrical, bell-shaped housing 72 having a continuous flange or a plurality of ears or lugs 74 defining a plurality of through openings 76 which are adapted to receive, for example, threaded fasteners 78 which facilitate installation and disassembly from the housing of the differential assembly 36 illustrated in FIG. 1. The cylindrical housing 72 receives and supports an anti-friction assembly such as a ball bearing assembly 80 which freely rotatably supports a bell-shaped input member 82. The input member 82 may include a stub shaft 84 having male splines 86. Other positive drive means such as keyways, hexagonal flats and the like may also be defined by the input stub shaft 84. A second anti-friction assembly such as a ball bearing assembly 88 freely rotatably supports a cylindrical output hub 92. The interior cylindrical wall of the input member 82 defines a plurality of female splines or gear teeth 94.

Disposed radially intermediate the cylindrical input member 82 and the cylindrical output hub 92 is a clutch annulus or collar 96 having male threads 98 about its periphery which are complementary to and engage female threads 102 on the inner surface of the input member 82. Thus, the clutch annulus or collar 96 may be threaded into and removed from the input member 82 by appropriate relative rotation therebetween as will be readily appreciated. Between the clutch annulus or collar 96 and the output hub 92 is a roller bearing assembly 104. A fluid tight elastomeric seal 106 is received within a circumferential groove 108 on the inside surface of the clutch annulus or collar 96 adjacent the roller bearing assembly 104 and provides a fluid tight seal between the output hub 92 and the clutch collar 96. A fluid tight seal is also provided between the outer surface of the clutch hub or collar 96 and the input member 82 by an O-ring 112 which is received within a circumferential groove 114 in the clutch annulus or collar 96. An output shaft 120 preferably includes male splines 122 which mate with and rotationally engage female splines 124 on the cylindrical output hub 92. A suitable oil seal 126 is disposed within the output hub 92 and maintains a fluid tight interior region generally within the cylindrical input member 82. The output shaft 120 includes an integral formed or intimately coupled or secured output bevel gear 128.

Turning now to the friction clutch elements themselves, the first electromagnetic clutch assembly 70 includes a primary or pilot friction clutch assembly 130 having a first plurality of larger diameter clutch plates or discs 132 with male or exterior splines which engage the female splines 94 within the input member 82. Thus, the larger diameter friction clutch plates or discs 132 rotate with the input member 82. Interleaved with the first plurality of larger diameter clutch plates or discs 132 is a second plurality of smaller diameter clutch plates 134 which have internal or female splines 136 which engage complementarily configured male splines 138 on a first circular member or plate 140 which is freely rotatably received upon the cylindrical output hub 92. The first and second plurality of clutch plates 132 and 134 include suitable friction material disposed on at least one surface of each plate. The first circular plate 140 includes a plurality of ramp-like recesses 142 arranged in a circular pattern about the axis of the output hub 92. The recesses 142 each define an oblique section of a helical torus.

Disposed within each of the recesses 142 is a load transferring ball 144 or similar load transferring member which rolls along the ramps defined by the oblique surfaces of the recesses 142. A second circular member or plate 146 of larger diameter is disposed in opposed relationship with the first circular plate 140 and includes a like plurality of complementarily sized and arranged recesses 148. The load transferring balls 144 are thus received and trapped within the pairs of opposing recesses 142 and 148, the ends of the recesses 142 and 148 being curved and much steeper in slope than the interior regions of the recesses 142 and 148 such that the load transferring balls 144 are effectively trapped in the regions defined thereby.

It will be appreciated that the recesses 142 and 148 and the load transferring balls 144 may be replaced with other analogous mechanical elements which cause axial displacement of the circular plates 140 and 146 in response to relative rotation there between. For example, tapered rollers disposed in complementarily configured conical helices may be utilized.

An important design consideration of the recesses 142 and 148 and the load transferring balls 144 is that their geometry and the overall design and clearances of the first electromagnetic clutch assembly 70 ensure that the clutch assembly 70 is not self-engaging. The first electromagnetic clutch assembly 70 must not self-engage but rather must be capable of modulating clamping of the friction clutch assemblies in direct, proportional response to the input signal provided by the controller or microprocessor 50.

The second circular plate 146 includes a plurality of female splines or gear teeth 152 which are complementary to and engage male splines or gear teeth 154 on the output hub 92. A circular plate 156 having splines 158 which engage the female splines 94 on input member 82 is disposed between the first or pilot friction clutch assembly 130 and the second circular member 146.

On the side or face of the first circular plate 140 opposite the second circular plate 146 is an annular flat washer 160. On the face of the flat washer 160 opposite the first circular plate 140 is a backup or support annular member 162 which seats within a circumferential triangular groove 164 in the clutch collar 96.

The flat washer 160 is preferably made of plastic such as a thermoplastic polyimide or similar material. For example, a plastic manufactured by Mitsui Chemicals designated Aurum JQC3025 is suitable, as is, DuPont Vespel®, an engineered low mu polyimide plastic. Both have been found to provide good performance. The plastic material should have a sufficiently high PV value such that is will not self-sacrifice under the load and speed conditions present in a particular application.

A secondary or main friction clutch assembly 170 resides between the second circular member 146 and a radially and circumferentially extending surface of the input member 82. The main friction clutch assembly 170 includes a first plurality 172 of larger diameter clutch plates or discs having male splines 174 which drivingly engage the splines 94 on the input member 82. Interleaved with the first plurality of larger diameter friction plates or discs 172 is a second plurality of smaller diameter plates or discs 176 having female splines 178 which engage the complementarily configured male splines 154 on the cylindrical output hub 92. Once again, the first and second plurality of clutch plates or discs 172 and 174 include suitable friction material disposed on at least one surface of each plate.

Disposed within a suitable recess 182 of the clutch collar 96 is an electromagnetic coil 184. The electromagnetic coil 184 is connected by a single or multiple conductor cable 186 to the controller or microprocessor 50 which provides electrical power.

In operation, the application of electrical energy to the electromagnetic coil 184 draws the plate 154 toward the clutch hub 96 and creates drag which tends to rotate the first circular plate or member 140 relative to the second circular plate or member 146, causing the load transferring balls 144 to ride up the recesses 142 and 148 thereby drive the plates or members 140 and 146 apart. The second member 146 acts as an apply plate and this axial motion compresses the main or secondary friction clutch pack 170 and transfers torque between the input member 82 and the output shaft 120. The flat washer 160 amplifies or augments the torque generated by the main or primary clutch pack 130.

Figure 4:
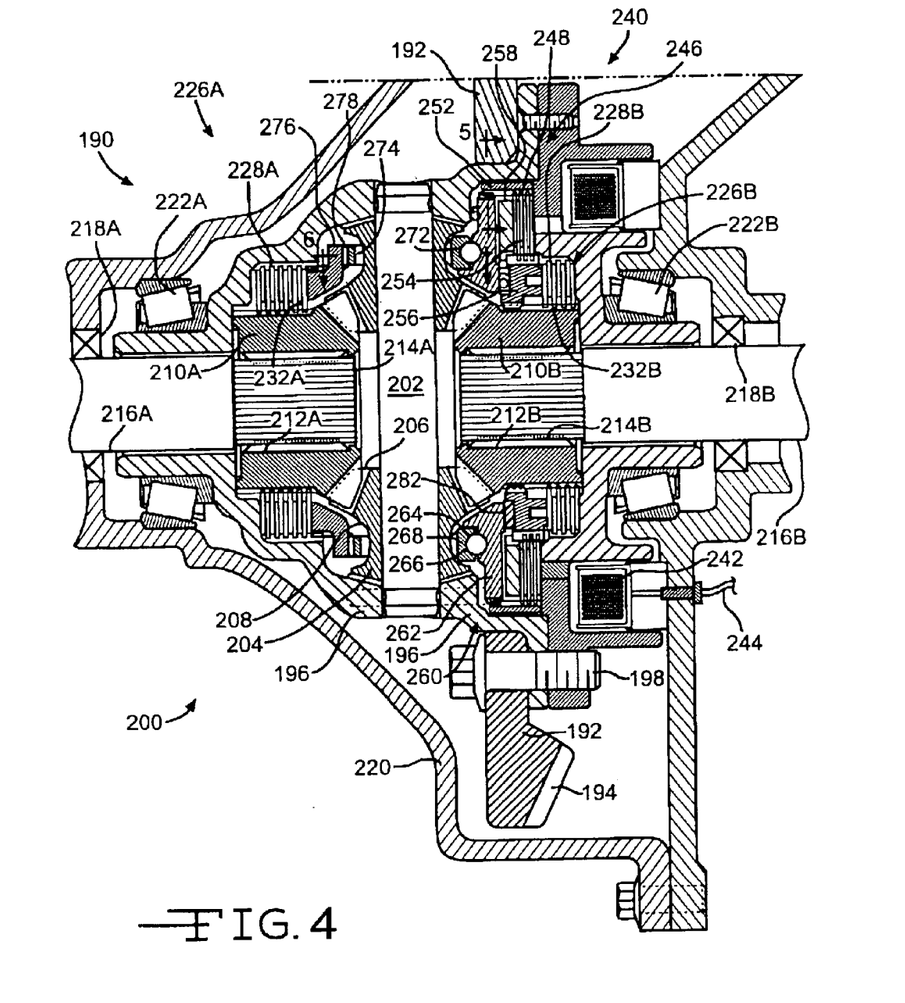
FIG. 4 is a fragmentary, enlarged, full sectional view of a second portion a rear axle assembly according the present invention.

Referring now to FIGS. 2 and 4, the rear axle assembly 36 also includes a bevel gear differential and second electromagnetic clutch assembly 190. The bevel gear differential and second electromagnetic clutch assembly 190 is driven through a side bevel gear 192 by the output bevel gear 128 which functions as the output the first electromagnetic clutch assembly 70. The side bevel gear 192 includes bevel gear teeth 194. The side bevel gear 192 is secured to a rotatable differential housing 196 by plurality of threaded fasteners as 198, one of which is illustrated in FIG. 4.

Disposed within the rotatable housing 196 is a bevel gear differential assembly 200. The bevel gear differential assembly 200 includes a stub shaft 202 which is oriented radially to the axis of rotation of the housing 196 and is secured thereto by a drive pin or other positive retaining means (not illustrated). Disposed for rotation about the stub shaft 202 are a pair of idler bevel gears 204. The idler bevel gears 204 each include bevel gear teeth 206 and preferably include a circular cutaway or reentrant portion 208 which provides clearance for other components of the differential assembly 200. In constant mesh with both the idler bevel gears 204 are a pair of side bevel gears 210A and 210B. Both of the side bevel gears 210A and 210B include internal female splines or gear teeth 212A and 212B, respectively, which engage complementarily configured splines 214A and 214B, respectively, on a pair of symmetrically disposed output shafts 216A and 216B which drive the left and the right axles 38, respectively. A pair of oil seals 218A and 218B provide a fluid tight seal between the respective shafts 218A and 218B and an outer housing 220. The rotatable housing 196 is supported within the outer housing 220 by a pair of anti-friction bearings such as tapered roller bearing assemblies 222A and 222B. Operably disposed between the left side bevel gear 210A and the rotatable housing 196 is a left secondary or main friction clutch pack or assembly 226A having a first plurality of larger clutch plates or discs 228A coupled by inter-engaging splines to the rotatable housing 196.

Interleaved with the first plurality of larger clutch plates or discs 228A is a second plurality of smaller friction clutch plates or discs 232A coupled by inter-engaging splines to the left side bevel gear 210A. Disposed in a substantially symmetrical arrangement with the left secondary or main friction clutch assembly 226A is a right secondary or main friction clutch pack or assembly 226B having a first plurality of larger friction clutch plates or discs 228B coupled by inter-engaging splines to the rotatable housing 196. The first plurality of larger friction clutch plates or discs 228A are interleaved with a second, plurality of smaller friction clutch plates or discs 232B coupled by inter-engaging splines to the right side bevel gear 210B. It will be appreciated that progressive compression of the secondary or main friction cutch assemblies 226A and 226B disposed between the side bevel gears 210A and 210B, respectively, and the rotatable housing 196 progressively inhibits differentiation by the differential and second clutch assembly 190.

Figure 5:
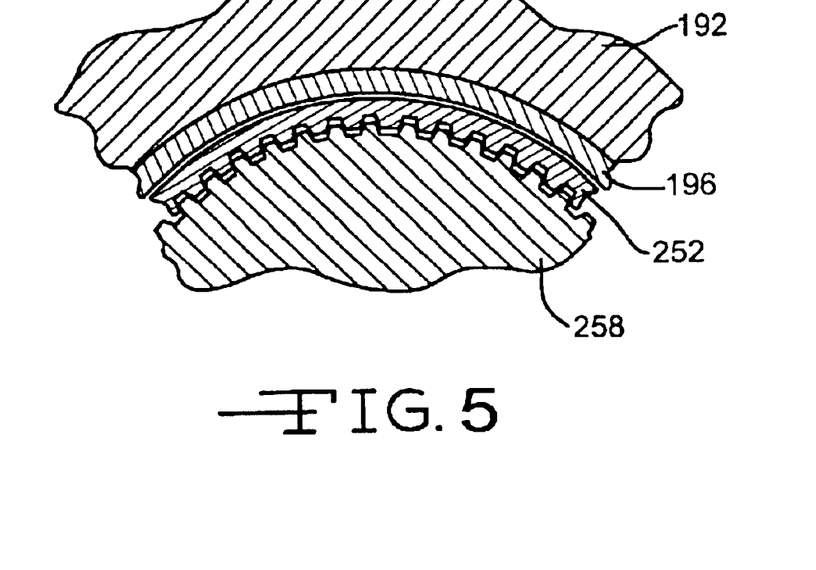
FIG. 5 is an enlarged, fragmentary, sectional view of components of the differential of a rear axle assembly according to the present invention taken along line 5—5 of FIG. 4.
Figure 6:
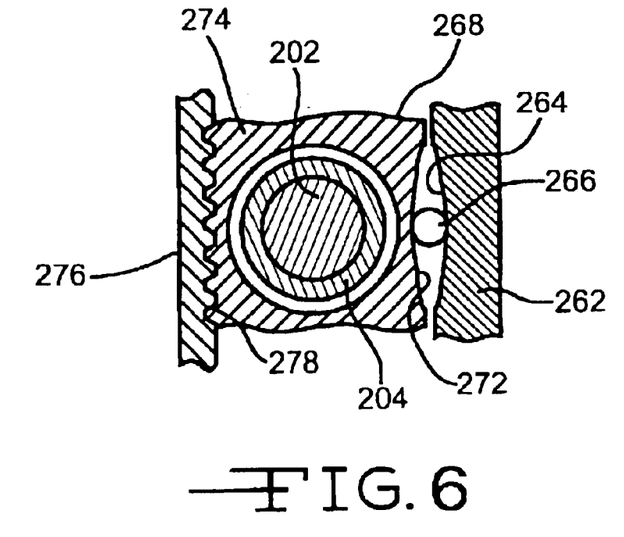
FIG. 6 is an enlarged, fragmentary, sectional view of a ball ramp operator of an electromagnetic clutch assembly according to the present invention taken along line 6—6 of FIG. 4.

Referring now to FIGS. 4, 5, and 6, compression of the main friction clutch assemblies 226A and 226B is achieved by an electromagnetic operator assembly 240. The electromagnetic operator assembly 240 includes an electromagnetic coil 242 which is stationary and which is supplied with electrical energy through a single or multiple conductor cable 244. The electromagnetic operator assembly 240 includes a primary or pilot friction clutch assembly 246 having a first plurality of larger clutch plates or discs 248 which are splined to a freely rotatable annular collar 252. A second, interleaved plurality of smaller clutch plates or discs 254 are splined to a first force applying collar 256. The force applying collar 256 is also coupled by inter-engaging splines to the right side bevel gear 210B and rotates therewith. A flat circular magnetic washer 258 is positioned on the side of the primary or pilot friction clutch assembly 246 opposite the electromagnetic coil 242 and is splined to the force applying collar 256.

The electromagnetic operator assembly 240 also includes a ball ramp operator assembly 260 having a first circular actuator member 262 which is splined to and rotates with the annular collar 252. The first circular actuator member 262 also engages and applies pressure to translate the force applying collar 256 toward the right secondary or main fiction clutch assembly 226B. The first circular member 262 includes a plurality of recesses 264 each defining an oblique section of a helical torus. Preferably, the first circular member 262 defines three such recesses 264. Each of the recesses 264 receives a load transferring ball 266. A second circular actuator member 268 defines a like plurality of symmetrical recesses of 272. The second circular actuator member 268 is a radially enlarged portion of an annulus 274 which extends to the left beyond the shaft 202 and engages an L-shaped circular apply plate 276. Rotation between the annulus 274 and the circular apply plate 276 is prevented by inter-engaging sets of face splines 278 or similar structures such as lugs and recesses disposed in complementary fashion on adjacent surfaces of the annulus 274 and the apply plate 276. The apply plate 276 is splined to the housing 196 and rotates therewith.

An important design consideration of the recesses 264 and 272 and the load transferring balls 266 is that their geometry and the overall design and clearances of the second electromagnetic clutch assembly 190 ensure that the clutch assembly 190 is not self-engaging. The first electromagnetic clutch assembly 190 must not self-engage but rather must be capable of modulating clamping of the friction clutch assemblies in direct, proportional response to the input signal provided by the controller or microprocessor 50.

Last of all, the electromagnetic operator assembly 240 includes a flat washer 282 disposed between the first circular actuator member 262 and the force applying member 256. The flat washer 282 is preferably made of plastic such as thermoplastic polyimide or similar material. For example, a plastic manufactured by Mitsui Chemicals designated Aurum JQC3025 is suitable, as is, DuPont Vespel®, an engineered low mu polyimide plastic. Both have been found to provide good performance. The plastic material should have a sufficiently high PV value such that is will not self-sacrifice under the load and speed conditions present in a particular application.

In operation, the bevel gear differential and second electromagnetic clutch assembly 190 provides modulating or proportional control between a first operating mode or condition, that of an open differential providing differentiation between the two output shafts 216A and 216B (and delivery of torque if it is being applied to the bevel gear 192) and a second operating mode or condition wherein differentiation is inhibited and the axles 216A and 216B are effectively locked and rotate together. These two limiting conditions as well as any selected level of partial differentiation is achieved by proportional or modulating activation of the second electromagnetic clutch by modulating the supply of electrical energy to the electromagnetic coil 242. As the electrical energy is increased to the electromagnetic coil 242, an increased electromagnetic flux is generated and drag is created across the primary or pilot friction clutch assembly 246. The drag created causes relative rotation between the first circular actuator member 262 and the second circular actuator member 268, causing the load transferring balls 266 to separate the circular actuator members 262 and 268, thereby compressing the secondary or main friction clutch assemblies 226A and 226B. Mechanically and operably disposed between the side bevel gears 210A and 210B and the rotatable housing 196, compression of the friction clutch packs 226A and 226B progressively and controllably inhibits differentiation by the bevel gear differential assembly 200. Full energization of the electromagnetic coil 242 inhibits differentiation by the differential assembly 200.

Three distinct operating modes or conditions are possible with the rear or secondary axle assembly 36 according to the present invention. For purposes of simplification, these three operating modes will be described as distinct on-off modes of operation, it being understood that modulating or proportional control of these modes, as described above is always possible to achieve a selected level of engagement between full off and full on. The first operating mode involves energization or actuation only of the first electromagnetic clutch assembly 70. In this operating mode, torque is delivered to the bevel gear differential assembly 200 and the second electromagnetic clutch assembly 190. Since the second electromagnetic clutch assembly is not energized, the bevel gear differential assembly 200 operates as an open differential, allowing speed differences between the two axles 216A and 216B and providing conventional differential operation.

A second operating mode or condition comprehends actuation and engagement only of the second electromagnetic clutch assembly 190 which inhibits differentiation by the bevel gear differential assembly 200. In this mode, no torque is delivered to the rear axles 216A and 216B but they are connected together through the main or secondary friction clutch assemblies 226A and 226B such that operation is like that of a vehicle with a solid rear axle.

In a third operating mode or condition, both the first electromagnetic clutch assembly 70 and the electromagnetic clutch of the bevel gear differential and second electromagnetic clutch assembly 190 are engaged. In this situation, torque is provided to the rear axles 216A and 216B but differentiation by the geared differential assembly 200 is inhibited. In this situation, torque is delivered to the rear axles 216A and 216B which rotate at the same speed. As noted above, the electromagnetic clutch assemblies, being modulating clutches, are capable of partially engaged operation in all of the foregoing operating modes or conditions.

The foregoing disclosure is the best mode devised by the inventor for practicing this invention. It is apparent, however, that devices incorporating modifications and variations will be obvious to one skilled in the art of rear axle assemblies having electromagnetic clutches and a geared differential. Inasmuch as the foregoing disclosure is intended to enable one skilled in the pertinent art to practice the instant invention, it should not be construed to be limited thereby but should be construed to include such aforementioned obvious variations and be limited only by the scope and spirit of the following claims.

I claim:

1. A rear axle for a motor vehicle drive line comprising, in combination,
    a first electromagnetic clutch having an input, an output, a first friction clutch pack operably disposed between said input and output, and a first electromagnetic operator associated with said first friction clutch pack,
    a bevel gear differential assembly having a rotable housing driven by said output of said first electromagnetic clutch, a pair of side bevel gears disposed in said housing and adapted to drive a respective pair of output shafts, a pair of idler bevel gears disposed in said housing and engaging said side bevel gears,
    a second electromagnetic clutch having at least one second friction clutch pack operably disposed between said rotatable housing and one of said pair of side bevel gears, and a second electromagnetic operator associated with said at least one second friction clutch pack.

2. The rear axle of claim 1 wherein said second electromagnetic clutch includes two of said second friction clutch packs.

3. The rear axle of claim 1 wherein said second friction clutch pack is operably disposed between each of said pair of side bevel gears and said rotatable housing.

4. The rear axle of claim 1 wherein said electromagnetic operators include a ball ramp actuator having opposed, relatively rotatable members defining recesses and load transferring members disposed in said recesses.

5. The rear axle of claim 1 wherein said clutches may be independently energized.

6. The rear axle of claim 1 further including a pair of output shafts operably driven by a respective one of said pair of side bevel gears.

7. The rear axle of claim 1 wherein said electromagnetic clutches each include a primary clutch pack and a secondary clutch pack.

8. A rear axle for a motor vehicle power train comprising, in combination,
    a first friction clutch having an input, and output, a first clutch assembly operably disposed between said input and output, and a first force generating operator associated with said first clutch assembly,
    a bevel gear differential assembly having a rotatable housing driven by said output of said first friction clutch, a pair of side bevel gears disposed in said housing, a pair of idler bevel gears disposed in said housing and engaging said side bevel gears, a second friction clutch having a least one second clutch assembly operably disposed between said rotatable housing and at least one of said pair of side bevel gears, and a second force generating operator associated with said second friction clutch assembly.

9. The rear axle of claim 8 wherein said force generating operators include an electromagnetic coil.

10. The rear axle of claim 8 wherein said force generating operators include a ball ramp actuator having opposed, relatively rotatably members defining recesses and load transferring members disposed in said recesses.

11. The rear axle of claim 8 wherein said side bevel gears are adapted to drive a respective one of a pair of output shafts.

12. The rear axle of claim 8 wherein said friction clutches include a pilot clutch assembly activated by an electromagnetic coil.

13. The rear axle of claim 8 wherein said friction clutches include a main clutch assembly activated by a ball ramp operator.

14. The rear axle of claim 8 further including a bevel gear set operably disposed between said output of said first friction clutch and said rotatable housing.

15. A rear axle for a motor vehicle drive line comprising, in combination, a first friction clutch having an input, and output, a friction clutch pack operably disposed between said input and output and an electromagnetic operator associated with said friction clutch pack, a differential assembly having a rotatable housing driven by said output of said first electromagnetic clutch, a first pair of gears disposed in said rotatable housing and adapted to drive a respective pair of output shafts, a second pair of gears disposed and said housing and engaging said first pair of gears, a second friction clutch assembly having a least one friction clutch pack operably disposed between said rotatable housing and at least one of said second pair of gears, and an electromagnetic operator associated with said second friction clutch assembly.

16. The rear axle of claim 15 wherein said second friction clutch pack is operably disposed between each of said second pair of gears and said rotatable housing.

17. The rear axle of claim 15 wherein said electromagnetic operators include a ball ramp actuator having opposed, relatively rotatable members defining recesses and load transferring members disposed in said processes.

18. The rear axle of claim 15 wherein each of said friction clutches include a primary clutch pack and a secondary clutch pack.

19. The rear axle of claim 15 wherein said friction clutches include a pilot clutch pack activated by an electromagnetic coil.

20. The rear axle of claim 15 wherein said friction clutches include a main clutch pack activated by a ball ramp operator.

* * * * *